Patented Feb. 18, 1941

2,231,890

UNITED STATES PATENT OFFICE

2,231,890

PROCESS FOR IMPROVING THE DYEING PROPERTIES OF ARTIFICIAL FIBERS, FOILS, FILMS, RIBBONS, AND THE LIKE, AND PRODUCTS OBTAINED THEREFROM

Paul Esselmann, Wolfen, Kreis Bitterfeld, and Josef Düsing, Dessau, Germany, assignors, by mesne assignments, to Walther H. Duisberg, New York, N. Y.

No Drawing. Application August 4, 1938, Serial No. 223,010. In Germany August 4, 1937

6 Claims. (Cl. 28—1)

This invention relates to a process of producing artificial fibers, films, foils, ribbons and the like materials capable of being dyed by acid wool dyestuffs.

It is an object of the present invention to provide a process by which artificial textile materials capable of being dyed by acid wool dyestuffs in the same manner as wool may be obtained.

A further object is the provision of artificial fibers, threads and the like textile materials, which consist of cellulose hydrate, cellulose acetate or a similar film- or fiber-forming polymer and which contain dispersed therein an addition of a basic artificial resin.

A further object resides in the provision of artificial fibers, which may be dyed by acid wool dyestuffs with a fastness to light and washing, which equals that of wool and which exceeds that of all the aminated fibers hitherto in use.

Still further objects of the invention will become apparent from the detailed specification following hereinafter.

In our copending application of even date Ser. No. 223,011 we have described a new type of synthetic resins, which are derived from alkyleneimines and aryl isocyanates or isothiocyanates by joint polymerization.

According to the disclosure of said copending application, the constituents employed for this joint polymerization, representing the isocyanates and isothiocyanates, are for instance, phenylisocyanate, phenylisothiocyanate, benzylisocyanate, and substituted products, while suitable alkylene imines are for instance, ethylene imine, propylene imine, N-propylethylene imine, N-benzylethylene imine, butylene imine and similar products. The polymers of these alkylene imines may also be employed.

Polymerization is preferably conducted at a raised temperature and in solution. Water, alcohols and solvents not containing hydroxyl groups may be used as solvents for ethylene imine. The resulting resins are thoroughly stable against acids and alkalis, contain about 15-20% of nitrogen, and dissolve in aniline or alcohols of high boiling point.

Polymerization of the reactants can be obtained by adding suitable acid or alkylene polymerization catalysts, and if catalysts are used at all, it is generally unnecessary to raise the temperature of the reaction mixture beforehand, since polymerization proceeds with considerable development of excess heat.

For example, ½ mol of phenylisocyanate is added drop by drop to an aqueous ethylene imine solution of 50% strength. The temperature is allowed to rise to 40° C. and is kept at that point as far as possible. After addition of the phenylisocyanate, the mixture is stirred strongly and then allowed to stand. A few hours later, further polymerization occurs during which temperatures above 200° C. may be attained.

The polymerization products may be purified by boiling with sulfuric acid of 10% strength and water. The reaction of aqueous ethylene imine with aromatic isocyanates or isothiocyanates has the disadvantage that one part of the cyanate reacts with water whereby the yield of pure polymerizate is reduced. It is more advantageous, therefore, to use an alcohol or a solvent free from hydroxyl instead of water, for instance, benzene, aniline, or a hydrocarbon having reactive halogen, such as trichloroethylene. The last named has proved especially suitable, since it forms an addition product with ethylene imine which essentially accelerates polymerization.

Polymerization may also advantageously be performed in the presence of an aromatic amine. The resins produced in this manner usually have a high melting point. They are also inexpensive, as the cheap aniline or the like may partly replace the alkylene imine.

These products contain basic nitrogen, are stable against alkalies and acids and are insoluble in most of the usual organic solvents. We have discovered that the resins hereinbefore referred to and described with more detail in our aforesaid copending application may with great advantage be used for imparting to fibers and other textile materials affinity for acid dyestuffs. The resins are incorporated within the fibers and foils by adding them to the spinning solution in finely sub-divided form, and spinning the fibers from said solution. Owing to the fact that the resins have a distinct basic reaction, they absorb the acid dyestuffs readily.

As is known, it has hitherto proved impossible to provide aminated cellulose which could be dyed as fast as wool, especially as regards fastness to light and washing. As against those processes in which the film- or fiber-forming colloids themselves, for instance the cellulose, are substituted by basic radicals, the process herein described has the distinct advantage of yielding fibers capable of being dyed as fast as wool.

The process according to the present invention may be carried out along the following lines:

The polymerization product may be suspended in an alcohol of high molecular weight or an aromatic amine, and the suspension may be added to a spinning solution made from cellulose, acetyl cellulose or another artificial fiber-forming colloid. It is possible, however, to directly employ the solution obtained during the production of the resins, preferably diluted to twice its volume with the previously used solvent.

The emulsification with the spinning solution may be secured in a simple manner by stirring, preferably immediately before the spinning. Until spun the spinning solution is preferably kept at room temperature.

It is, however, possible to add the artificial resin at any other stage in the production of the spinning solution.

The fibers spun in the manner indicated above show normal tensile strength. In their appearance they only differ from ordinary artificial threads not provided with basic resins by the fact that they are to a certain extent delustered. The fibers contain about 1.5 per cent of nitrogen and more. As has already been stated they possess exactly the character of wool from the standpoint of the colorist. In some cases the fibers even possess a hydrophobic character owing to the presence of the hydrophobic resin therein. The hydrophobic character can be increased by addition of more than the usual amount of artificial resin.

The following examples serve to illustrate the invention:

*Example 1.*—200 grams of the resinous product obtained by the joint polymerization of ethyleneimine and phenyl-isocyanate (compare for instance Example 1 of the copending application referred to on page 2, line 20) are dissolved in 500 grams of cyclohexanol by heating gently. The solution is stirred thoroughly into 10 liters of viscose (7.7 per cent of cellulose, 6.35 per cent of alkali) until the whole is homogeneously distributed in the viscose. The spinning follows normal lines and fibers are obtained which, after final washing and drying do not differ in their physical constants from the normal fibers obtained without the addition of the basic resin, but resemble wool in their dyeing properties.

*Example 2.*—By using the synthetic resin from ethyleneimine and phenylisocyanate produced in the presence of trichloroethylene (Example 3 of the aforementioned copending application) there are obtained fibers containing 1.73 per cent of nitrogen, which show dyeing properties resembling those of wool. Three liters of the highly viscous solution of the resin are diluted with a mixture of 1 liter of cyclohexanol and ½ liter of aniline. The whole is well emulsified in 115 liters of viscose and the viscose is spun. The viscoses ready for spinning may be extruded into acid decomposing baths or into neutral salt baths, for instance ammonium sulfate solutions. The fibers thus produced have obtained a wool-like character without any alteration in the physical constants as against the normal viscose fibers.

*Example 3.*—400 cc. of the colorless solution obtained by polymerizing together ethyleneimine, trichlorethylene and phenylisothiocyanate and heating the resultant product (Example 5 of the copending application hereinbefore referred to), are added to 10 liters of viscose and well stirred. The fibers spun from the viscose in known manner show a wool-like character as regards the dyeing properties.

*Example 4.*—230 grams of the resinous product obtained according to Example 3 of the copending application Ser. No. 223,011 from ethyleneimine and phenylisocyanate are dissolved in 10 kilos of acetone to which have been added 15 to 20 grams of ethyl alcohol. To this solution there are added 2.2 kilos of cellulose acetate, whereafter the mixture is stirred until the dissolution is complete, which requires about 12 hours. The clear cellulose acetate spinning solution thus obtained is filtered and spun according to the dry spinning method. The acetate fibers thus obtained are dried in known manner. The nitrogen-content of the fibers amounts to about 1.5 per cent, they show distinct affinity for acid dyestuffs and an excellent fastness to washing.

*Example 5.*—To about 10 kilos of an ordinary cuprammonium cellulose solution containing 7 per cent of cellulose there are added 400 grams of a solution in aniline containing 30 per cent of a resin from phenyl isocyanate and ethyleneimine produced by joint polymerization. After all the constituents have been homogeneously mixed, the spinning solution is spun as usual in the copper oxide ammonia method in a spinning funnel. The temperature of the precipitating water is 30° C. After leaving the funnel the threads are acidified and collected on a bobbin. In order to obtain a complete coagulation the threads are again treated on the bobbins with the acid used for hardening. The fibers obtained after soaping and drying show a distinct affinity for acid wool dyestuffs.

What we claim is:

1. Artificial textile materials capable of being dyed by acid wool dyestuffs in the same manner as wool, comprising a film- or fiber-forming polymer incapable per se of being dyed by acid dyes, and finely distributed therein the product of the joint polymerization of an alkyleneimine and a compound selected from the group consisting of aryl isocyanates and aryl isothiocyanates.

2. Artificial textile materials capable of being dyed by acid wool dyestuffs in the same manner as wool, comprising cellulose hydrate, and finely dispersed therein the product of the joint polymerization of an alkyleneimine and a compound selected from the group consisting of aryl isocyanates and aryl isothiocyanates.

3. Artificial textile materials capable of being dyed by acid wool dyestuffs in the same manner as wool, comprising cellulose acetate, and finely dispersed therein the product of the joint polymerization of an alkyleneimine and a compound selected from the group consisting of aryl isocyanates and aryl isothiocyanates.

4. Artificial textile materials capable of being dyed by acid wool dyestuffs in the same manner as wool, comprising cellulose hydrate, and finely dispersed therein the product of the joint polymerization of ethyleneimine and phenylisocyanate.

5. Artificial textile materials capable of being dyed by acid wool dyestuffs in the same manner as wool, comprising cellulose hydrate, and finely dispersed therein the product of the joint polymerization of ethyleneimine and phenylisothiocyanate.

6. Artificial textile materials capable of being dyed by acid wool dyestuffs in the same manner as wool, comprising cellulose acetate, and finely dispersed therein the product of the joint polymerization of ethyleneimine and phenylisocyanate.

PAUL ESSELMANN.
JOSEF DÜSING.